United States Patent [19]

Mecklenborg et al.

[11] 3,985,422

[45] Oct. 12, 1976

[54] REVOLUTIONARY SCHEIMPFLUG VISUAL PROBE

[75] Inventors: Richard A. Mecklenborg, Binghamton; Richard E. McClenahan, Johnson City, both of N.Y.

[73] Assignee: The Singer Company, Binghamton, N.Y.

[22] Filed: May 1, 1975

[21] Appl. No.: 573,623

[52] U.S. Cl. .................................. 350/54; 350/320
[51] Int. Cl.² ........................................ G02B 27/00
[58] Field of Search ................. 350/54, 50, 285, 6, 350/247, 252, 320; 355/52; 353/67, 70

[56] References Cited
UNITED STATES PATENTS
3,914,011  10/1975  Mallinson et al. .................... 350/50

Primary Examiner—John K. Corbin
Assistant Examiner—Jon W. Henry
Attorney, Agent, or Firm—James F. Duffy; James C. Kesterson

[57] ABSTRACT

Scheimpflug correction is achieved by maintaining Scheimpflug relay lenses at a fixed tilt angle with respect to the axis of the lens system and revolving pairs of said relay lenses about said system axis. The present disclosure revolutionizes previous concepts of how Scheimpflug correction may be achieved, permits the use of less complex lens structures of fewer elements, eliminates the problem of image displacement and reduces to relative simplicity the mechanical drive requirements of the movable elements while totally eliminating the need to translate lenses to compensate for lens tilt angle adjustments.

7 Claims, 7 Drawing Figures

REVOLUTIONARY SCHEIMPFLUG VISUAL PROBE

BACKGROUND OF THE INVENTION

This invention relates to optical systems used for viewing models of terrain in association with aircraft flight simulation and more particularly with means for reducing the number of mechanical articulations which must be coordinated and servo controlled when multi-stage Scheimpflug correction is provided said systems.

The ability of the Scheimpflug-relay optical probe to produce erect images of near infinite depth of field lends itself to use with aircraft simulator training devices where the probe is "flown" over a scale model terrain and the scale factor causes the apparent aperture of the objective lens to be very large, with subsequent reduction in depth of field. The prior art probe consists of a series of lenses, certain of which may be tilted to erect the image and other non-tiltable lenses which are either fixed in position or whose position may be translated along the optical axis of the probe to compensate for changes induced by the tilting lenses, as well as those resulting from variations in altitude and attitude of the probe. If infinite depth of field is to be realistically approached, the movement of the various lenses comprising the probe and the length of the optical path must be controlled precisely.

When an optical probe is used to scan a scale model of the ground in conjunction with aircraft flight-simulation trainers, the optical axis of the probe normally lies along the simulated flight path of the trainer, i.e., above and near parallel to the surface of the scale model being scanned. Of necessity then, the object plane, that of the model, is at an angle to the lens plane of the probe and, as taught by Scheimpflug, the image is formed on a plane inclined to the axis of the lens system of the probe. (See U.S. Pat. No. 751,347 issued Feb. 2, 1904.)

Scheimpflug's early teachings have been extrapolated by latter-day technicians and applied to the problems of (1) erecting the inclined plane of the image; (2) eliminating trapezoidal distortion; while (3) retaining near infinite depth of field in the final image.

The basis for the theoretical design of an optical probe using Scheimpflug correction is the so-called Scheimpflug condition:

The plane containing the original object and the plane containing the projected image, as well as the principal plane of the objective lens, all intersect along one common line defined by Scheimpflug as the axis of collimation.

Armed with knowledge of the Scheimpflug condition, persons skilled in the prior art of optical probe design have derived the necessary relations the degree of tilt of internal lenses and the variation of optical path length required to meet the problems enumerated above.

However, the complexity of these systems has proven costly and often the mechanical adjustments have been imprecise or precision has been sacrificed to reduce cost.

As an example of the complexity of prior art devices, one may consider that each tilting lens was mounted on an individual shaft which had to be rotated independent of the rotation of other lens shafts. Optical path length adjustments were individually controlled and separate control of the focal length of various lenses had to be incorporated as well. These methods, as already noted, have proven costly and at best imprecise.

A full background discussion of prior art Scheimpflug probes, given in terms of "thin lenses", is presented in U.S. Pat. No. 3,914,011, of R. A. Mecklenborg and R. B. Mallison issued Oct. 21, 1975, which discussion is incorporated herein by reference.

In practice the lens designer's problems are complicated in that the Scheimpflug condition must be modified somewhat for the typical case in which the lens is not a simple thin lens having only one principal plane but is a more complex or "thick lens" having two principal planes. In considering the use of thick lens systems, the axis collimation is considered first to be the line of intersection of object plane with the first principal plane of the lens. This line or axis is then transferred at unit magnification to the second principal plane where it represents the intersection of said second principal plane with the plane of the projected image.

Because a lens has a restricted field of view, there is a practical limit to how much the "Scheimpflug lens" can be rotated. Therefore, there is also a limit to the amount of correction which may be attained using only one such rotating lens. In a probe operating at low altitudes the intermediate image tilt becomes so great that it is not possible to obtain full correction with a single tilting relay and maintain adequate resolutuion. Therefore multiple stages are employed, each reducing the image tilt until the final image is again perpendicular to the system axis. But where lenses are cascaded, light scatter by lens surfaces, transmission losses and tolerance accumulation put a practical restriction on the number of relay stages which may be so used.

The current state-of-the-art has produced a probe with two dynamic tilting Scheimpflug relay lenses and one fixted tilt Scheimpflug relay lens. This system has limited resolution. The limited resolution arises from the fact that in conventional Scheimpflug system there are two requirements which resctrict the relay design possibilities:

1. Although the instantaneous field requirement of the dynamic tilting relay lenses is small compared to the total field angle capability, the entire field must be corrected because, as the probe moves from maximum to minimum simulated altitudes, the lenses must tilt through their entire field. Therefore, the correction must be compromised over the entire field rather than being optimized over a smaller instantaneous dynamic field.
2. The entrance and exit pupils and both principal planes of the relay lenses must be coincident at the tilting axis. If they are not, the pupils and image will be displaced off the system axis with tilt. In this case the relay of the image becomes a hopelessly complex design and implementation problem. This requirement severely limits the choice of lens types to a lens which is very difficult to correct without a large number of elements. Poor performance will result due to scattering, absorption and closer tolerance and design constrictions.

It is an object of this invention to simplify the task of the designer of the lens system of the Scheimpflug probe by removing the requirements of total field correction, and zero pupil and principal plane separation imposed on prior art devices.

It is another object of this invention to derive a simple, relatively inexpensive Scheimpflug lens system having high precision which eliminates the need to translate any lenses along the optical axis.

A further objective of the invention is the elimination of the prior art's lens-tilting techniques in favor of a less complex scheme of achieving Scheimpflug correction.

SUMMARY OF THE INVENTION

In the improved Scheimpflug probe herein disclosed the Scheimpflug relay lenses are maintained at selected fixed tilts relative to the probe system axis.

Revolution of pairs of relay lens about the system axis while maintaining the fixed tilt angle with respect to that axis provides for Scheimpflug correction.

By revolving the relay lenses in pairs the constriction of zero or minimal principal plane separation is obviated and no need for optical path length compensations arises as image tilt is corrected.

DESCRIPTION OF THE INVENTION

When the Scheimpflug patent (N. 751,347) issued in Feb. 1904, its teachings relative to tilting lenses and image planes set the stage for future technicians working with optical systems which required the erection and rectification of optical images. The operative word was "tilt", and the latter-day technicians, applying Scheimpflug's teachings learned that by varying the tilt angle of a lens, the tilt angle of the image plane could be controlled.

Figure 1:
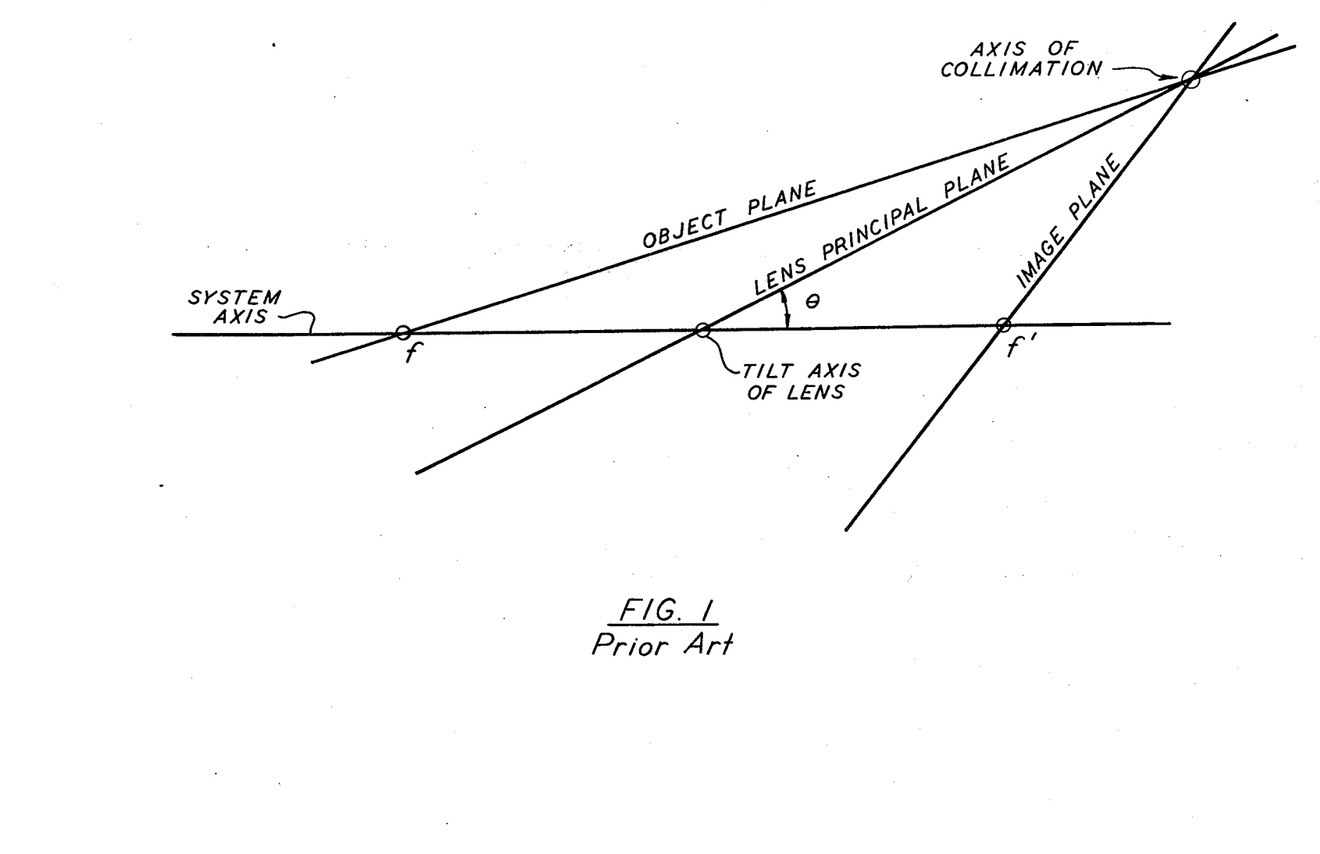
FIG. 1 Illustrates the Scheimpflug Condition.

FIG. 1 sets forth pictorially the Scheimpflug condition. Note that the object plane, the image plane and the lens principal plane all meet in a line designated as the axis of collimation, as taught by Scheimpflug. The tilt axis of the lens is indicated as well as the tilt angle Θ. Observe that decreasing the magnitude of angle Θ will cause the axis of collimation to move toward the right of FIG. 1, while increasing Θ moves the axis to the left.

Of necessity the tilt of the image plane must vary as the axis of collimation, if the Scheimpflug condition is to be fulfilled.

Let a line 10 be drawn which lies in a principal plane of the lens and which intersects the system axis. (The system axis is that axis central to a series of lenses, some of which may be displaced from said system axis as hereinafter disclosed.)

Figure 2:
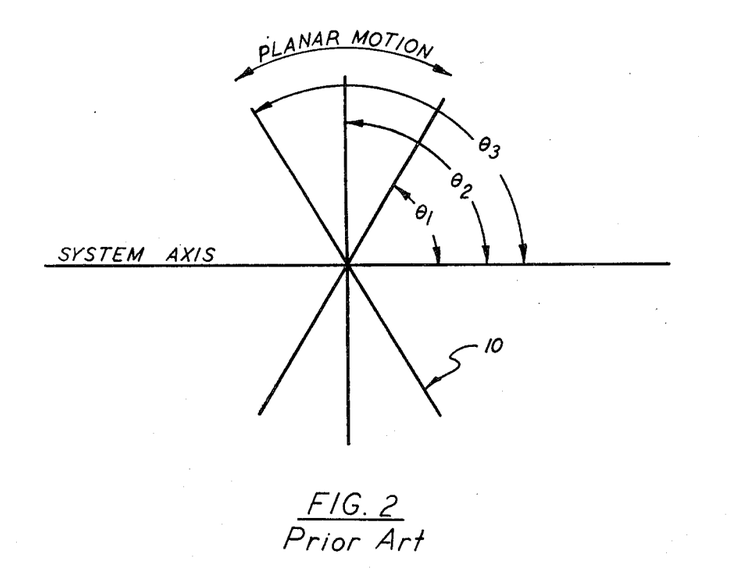
FIG. 2 Shows the motion experienced by prior art tilting lenses in achieving Scheimpflug correction.

FIG. 2 depicts the motion experienced by said line as the lens is tilted through varying tilt angles Θ. Notice that the line moves always in the plane of the paper, that portion of the line above the system axis describing the motion of a metronome while that below the axis moves pendulum fashion. Such motion characterizes prior art devices.

Figure 3:
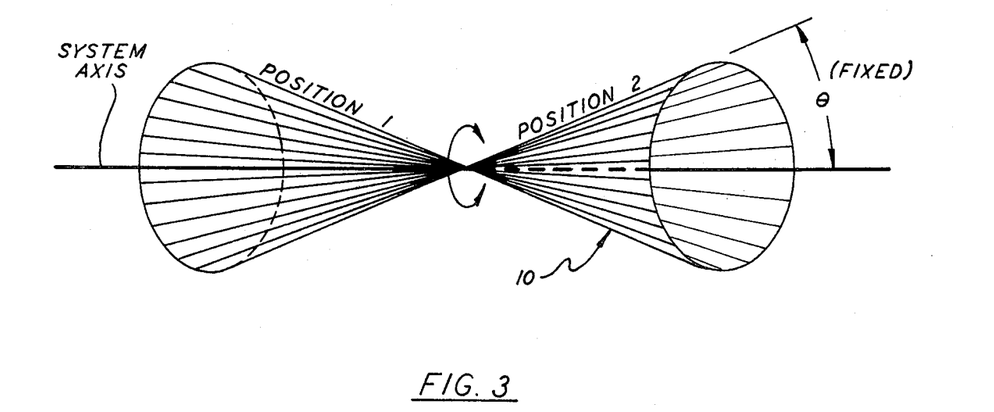
FIG. 3 Indicates the motion experienced by the revolutionary lens of the present invention in achieving Scheimpflug correction.

The present invention is characterized by a different form of motion. Instead of allowing the tilt angle Θ to vary, the angle is held fixed and the lens is caused to revolve about the system axis while the tilt angle is so maintained. FIG. 3 is drawn to show the effect of this revolutionary movement upon the line referred to in the discussion immediately above.

Unlike the line of FIG. 2, the line drawn in FIG. 3 lies wholly within the plane of the paper at only two positions, positions 1 and 2, while for all other positions, the line intersects the plane of the paper such that a segment of the line is above the paper while the remaining segment is below. Whereas the line of FIG. 2 described a purely planar figure, the line of FIG. 3 defines a three dimensional figure-of-revolution which may be described as two cones joined to each other at their apexes.

It will be shown that such revolutionary motion of a fixed-tilt lens may be used to erect a tilted image plane.

As noted in the background discussion, two severe restrictions exist which affect the optimum design of Scheimpflug relay lenses. These are:
1. the inability to use and optimize only a small instantaneous dynamic field; and
2. the need to have both exit and entrance pupils, as well as both principal planes, coincident with the tilt axis.

Figure 4:
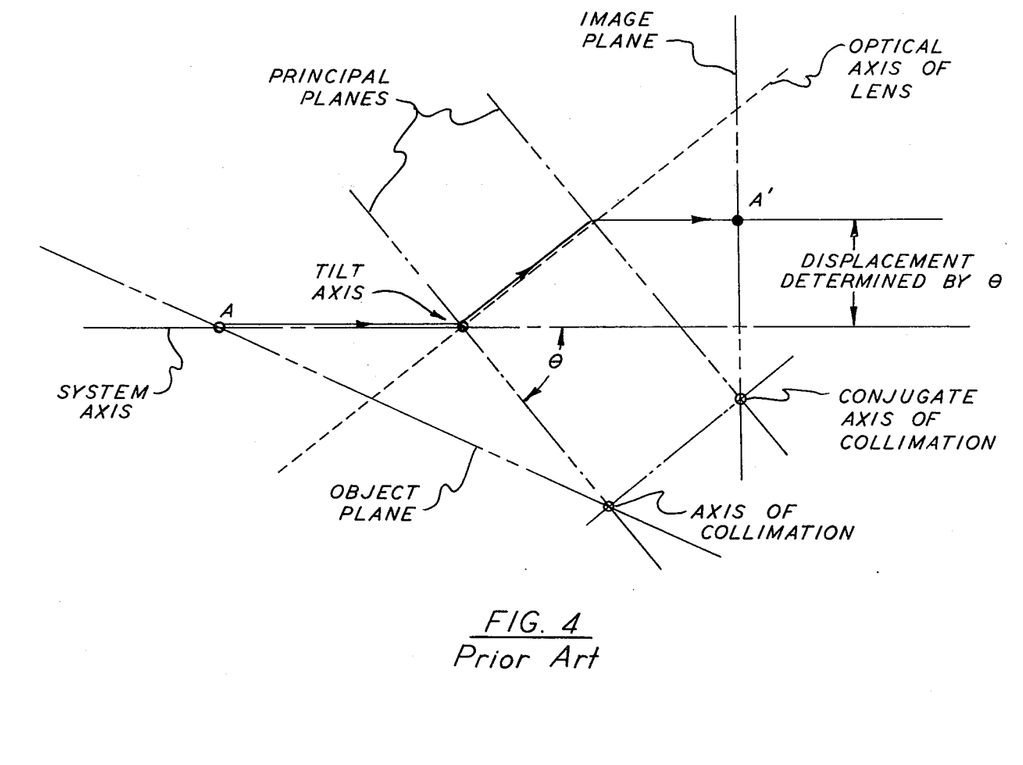
FIG. 4 Shows the image displacement caused by tilting a "thick" lens as in prior art devices.

The first restraint is reasonably obvious since it is simple to conceive that the relatively small instantaneous dynamic field must shift about the available field as the lens is tilted. However, the second constraint on design optimization is more readily understood using an illustration. FIG. 4 depicts the displacement of the image A' of an object point A when a typical thick lens is tilted and the tilt axis is not coincident with the pupils and principal planes of the lens. As shown, object point A lies on the system while its image A' is displaced above the system axis. The actual displacement is a function of the magnitude of the tilt angle Θ.

Eliminating such image displacement presents a problem more often compromised than solved because of the complexity and cost involved.

A Scheimpflug probe, with its peculiar lens constraints and precision mechanical linkages, has always been conceived of as a rather sophisticated and expensive device. The previously noted patent to Mallison and Mecklenborg, U.S. Pat. No. 3,914,011, taught a major simplification in the mechanical arrangement of lenses and associated drive mechanism of a conventional Scheimpflug probe. The present disclosure revolutionizes previous concepts of how Scheimpflug correction may be achieved, permits the use of less complex lens structures of fewer elements, eliminates the problem of image displacement and reduces to relative simplicity the mechanical drive requirements of the movable elements while totally eliminating the need to translate lenses to compensate for lens tilt angle adjustments.

Basic to the concept taught by this invention is that the Scheimpflug relay lenses may be set at a fixed tilt angle to the system axis and Scheimpflug correction obtained by a simple revolution of the lenses about the system axis while the fixed tilt angle is maintained.

Figures 5, 6:
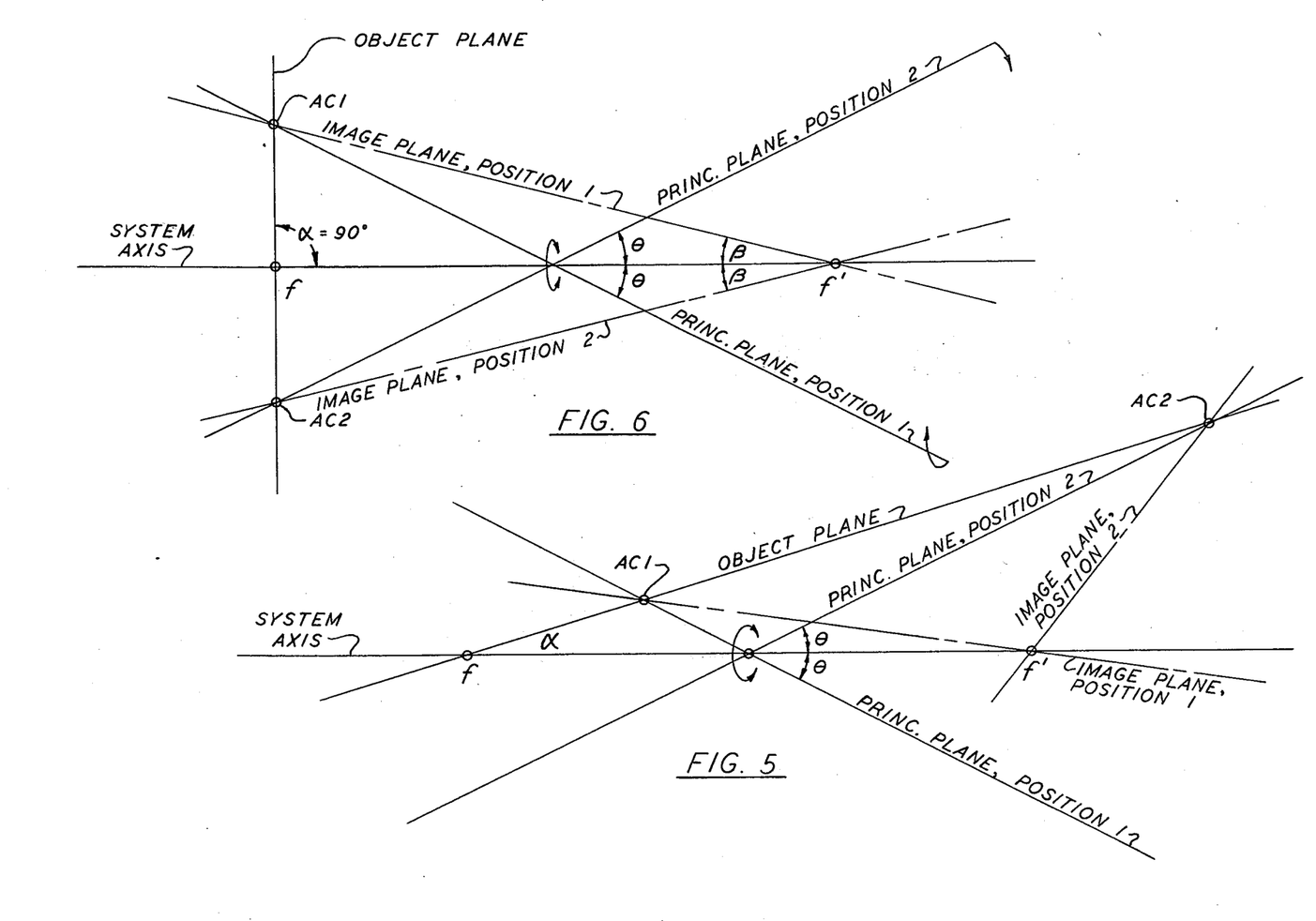
FIG. 5 Depicts the variation in tilt angle of the image plane which results when a tilted object is viewed by a fix-tilt, revolving lens.
FIG. 6 Illustrates the static tilt angle of the image plane which results when an erect (non-tilted) object is viewed by a fix-tilt, revolving lens.

This revolutionary approach to achieving Scheimpflug correction may be more fully understood by referring to FIG. 5 and remembering always that the constraints of the Scheimpflug condition must be met.

FIG. 5 shows a portion of an optical system having an object plane which is tilted with respect to the axis of the system by an angle $\alpha$.

A lens is indicated by showing its principal plane. Although only one principal plane is shown, the discussion of FIG. 5 is not limited to thin lenses or lenses having their principal planes coincident. Since the image is transmitted from one principal plane to the other at unity magnification the relationships established by Scheimpflug are easily shown. Only one principal plane is shown in FIG. 5 for clarity of illustration. The effect of principal plane separation on image displacement, already noted, will be discussed further, later in this disclosure.

In FIG. 5 the principal plane is illustrated for two positions, position 1 and 2, of the revolving lens. The tilt angle $\Theta$ is held constant as the lens is revolved about the system axis.

With the lens disposed so that its principal plane intersects the plane of the paper as indicated in position 1, the object plane, image plane, and principal plane must intersect in the axis of collimation designated AC1. In this position the image plane is depressed and lies relatively close to the system axis.

In Position 2 the lens has been revolved about the system axis 180°, still maintaining the tilt angle $\Theta$. In this position, the axis of collimation has moved to the location denoted as AC2 and the image plane has moved away from the system axis to a more nearly erect position.

If one views FIG. 5 and in his mind's eye continues the revolution of the lens through various angles of revolution intermediate of those depicted by positions 1 and 2, one will observe that the resultant location of the axis of collimation and the tilt of the image plane vary as a function of the degree of revolution of the lens about the system axis.

One may visualize a position in which revolution of the lens has brought the principal plane parallel to the object plane. In this case, the axis of collimation will lie at infinity and the image plane will also bear a parallel relationship to the object plane.

At another point in the lens revolution, one can conceive of the axis of collimation falling such that the image plane forms a right angle with its intersection of the system axis. In this position, the image is said to be erect, which is the desired end result.

Before one considers utilizing the disclosed revolutionary lens invention, there is a special case which must be accessed. This is the effect that a fix-tilt revolving lens and a non-tilted (i.e., erect) object have upon the image tilt angle.

FIG. 6 is similar to FIG. 5 in that the lens is maintained at a fixed tilt, is principal plane forming an angle $\Theta$ with the system axis. In FIG. 6 however, the object plane intersects the system axis at an angle $\alpha$, equal to 90°. In this case, revolution of the lens has no effect on the image plane tilt angle $\beta$. Revolving the lens causes the image plane to revolve as well (as was also true in the situation depicted in FIG. 5) but the tilt angle of the image plane remains fixed and it is impossible to erect the image plane unless further provision to do so is made.

Such further provision may take the form of a second revolutionary lens desiged specifically to erect an intermediate image which image is inclined at some fixed tilt angle $\beta$.

Consider the following details derived from the foregoing discussion:

A. For a tilted object there is an infinite variety of tilt angles at which the image plane may be caused to lie as a function of lens revolution.

B. For an erect object there is one and only one tilt angle at which the image plane will lie regardless of lens revolution. This image plane tilt angle may be designated $\beta$ and its magnitude is a function of the magnitude of the fixed tilt angle $\Theta$ of the revolutionary lens.

Given two revolutionary lenses an object may always be caused to be imaged between the lenses on an intermediate image plane of tilt angle $\beta$, regardless of the tilt angle of the object, by a simple revolution of the first lens. This intermediate image may itself then be imaged on a final image plane which is caused to be erect by revolution of the second lens.

Designers of lenses for Scheimpflug corrected optical systems are well aware that it is simpler to design a lens to erect an object whose tilt angle is known and fixed than to design for an object whose tilt angle is arbitrary and variable. Therefore, the design of the second of the pair of revolutionary lenses in the above example may be of relatively simple and inexpensive design when compared with the design requirements of the first lens of the revolving pair.

The relative difficulty, just noted, experienced in designing the first of the revolutionary lens pair when compared to the second lens pair is in itself rather trivial when compared to the problems and costs faced by the lens designer of prior art devices. As will be shown, the lens designer using the invention herein disclosed will be able to use and optimize a small instantaneous dynamic field rather than having to compromise the lens design over the entire field of the lens as prior art designers had to do.

Being able to optimize a small instantaneous dynamic field eliminates the first of the two severe restrictions, discussed earlier, which the lens designer faces. However, revolving a thick lens in the manner discussed to achieve Scheimpflug correction will not, in itself, eliminate the problem of image displacement previously noted and depicted in FIG. 4. This invention eliminates the image displacement problem by revolving the Scheimpflug lenses in pairs as shown in FIG. 7.

Figure 7:
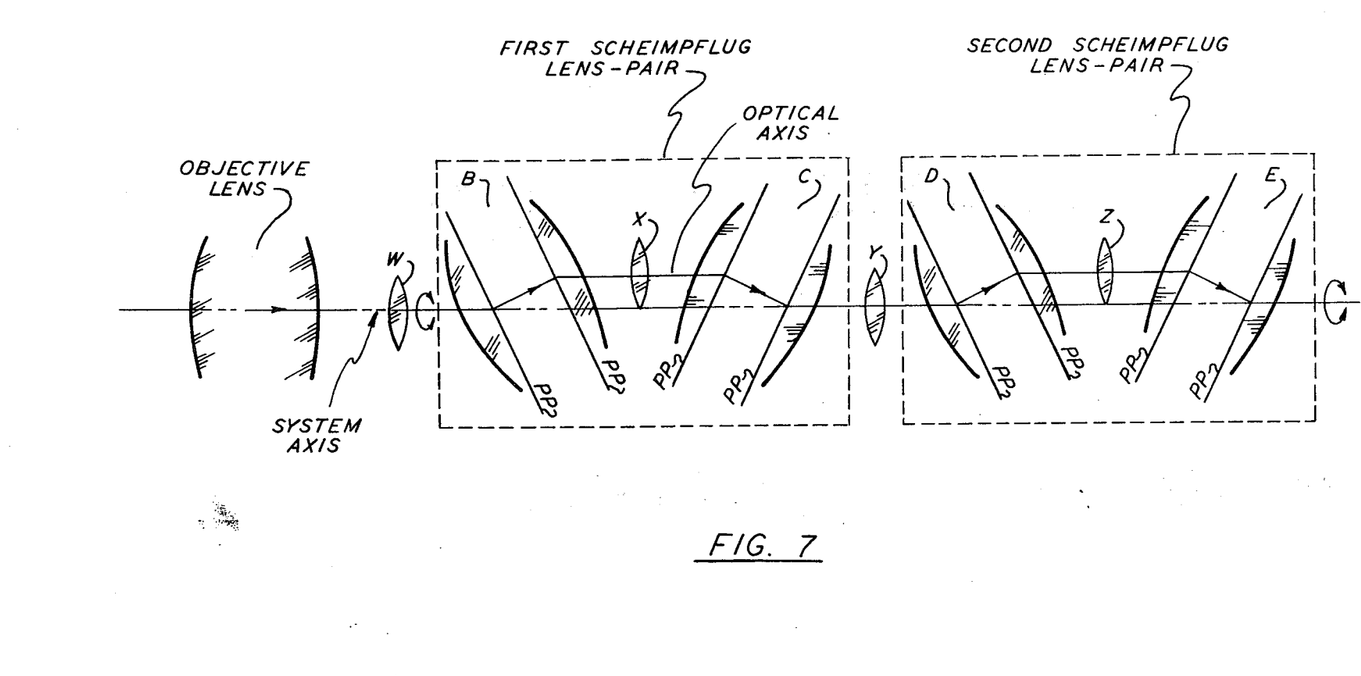
FIG. 7 Illustrates a four stage embodiment of the invention.

FIG. 7 illustrates the teaching of this invention by showing a Scheimpflug probe having four Scheimpflug relay lenses, B-C-D and E; four field lenses W-X-Y and Z, each of which images the exit pupil of a preceding lens onto the entrance pupil of a succeeding lens; and an objective lens. In a typical simulator application the final output image would be presented to a television vidicon tube.

FIG. 7 indicates, by means of dotted lines, that the Scheimpflug relay lenses are grouped in pairs with one off-axis field lens. The first pair comprises relay lenses B and C and field lens X. The second pair is made up of relay lenses D and E and field lens Z.

Field lens Y, between paired stage (B,C) and paired stage (D,E), is designed so that the exit and entrance pupils of the relay stages are on the system axis. Field lenses X and Z relay the pupils from one relay lens to another, and preserve the geometry of the image. Field lens W relays the exit pupil of the objective lens onto the entrance pupil of relay lens B.

Relay lenses B, C, D, and E are thick lenses, i.e., their principal planes PP are not coincident. However, as may be seen from FIG. 7, when Scheimpflug relay lenses are used in pairs, as here taught, the image displacement introduced by one tilted relay lens having separated principal planes is compensated by the second such relay lens, which is tilted in the opposite direction. An object on the system axis will be imaged on that axis at the output of such a Scheimpflug pair, regardless of rotation of the lens pair. Similarly, objects displaced from the system axis have that particular displacement preserved in the image. This feature of preserving the relative location of image and object with respect to the system axis while achieving Scheimpflug correction is a major improvement over prior art devices.

Since the principal planes of the Scheimpflug lenses are maintained at a fixed tilt angle with respect to the system axis of the probe, and because image tilt correction is attained by revolution of the lenses about the system axis, only a small portion of the total available field of the lenses comprises the dynamic field. Optical correction of this small dynamic field may thus be optimized. This avoids the compromise corrections of the total field presently employed with prior art devices. Whereas the lens designer working with tilting lens systems was faced with the insurmountable task of trying to correct a 25 to 30° field, the designer of lenses used in the present invention need optimize only a five degree annular ring at the edge of that field.

Prior art Scheimpflug correction systems, with their reliance upon variable lens tilt angles, experienced a variation in path length between object and image planes as the tilt angle changes. This required a translation of the various lens elements along the optical path to preserve the image. In the present invention, revolution of the lenses and maintenance of a fixed tilt angle preserves the path length between object and image and thus obviates the need for any translational corrections.

As presented in FIG. 7, image tilt correction is maximum. Revolution of one pair of Scheimpflug lenses 180° with respect to the other pair results in zero image tilt correction.

In utilizing the invention in the embodiment illustrated in FIG. 7 the first Scheimpflug lens pair (B,C) would be revolved to bring the intermediate image to some predetermined tilt angle $\beta$. The second Scheimpflug lens-pair (D,E) is then revolved so as to erect the final image.

When used in an optical probe with a vehicle simulator, practical model scales and the low eyeheights that must be simulated dictate a requirement that the invention take essentially the form disclosed in FIG. 7. Each of the four Scheimpflug lens B, C, D and E will have their optical axes tilted with respect to the system axis by an angle of approximately 22° for maximum correction. The intermediate image plane tilt angle $\beta$ will then be adjusted to approximately 39° by revolution of lens-pair (B, C) and the final image will be then erected by revolution of lens pair (D, E). Individual relay lenses having magnification in the range 0.5 to 2.0 may be employed.

Another advantage of the revolutionary Scheimpflug visual probe may now be disclosed. When prior art Scheimpflug probes were used in conjunction with simulators of vehicles which were capable of pitch and yawing motions, such as an aircraft or ship, the entire probe assembly had to be rotated about the system axis of the probe in order to preserve the Scheimpflug correction. Because of the high quality and realism of the visual presentation which must be presented to the trainee-operator of the simulator and the massiveness of the entire probe assembly itself, the electromechanical design of the system required to rotate the entire probe assembly could prove both challenging and costly.

With the present invention it is a simple matter to revolve only both Scheimpflug lens-pairs simultaneously to correct for pitch and yaw of the vehicle simulated since the ability to do so is inherent in the invention itself. This results in a savings of both cost and design effort.

In addition, the present invention offers greater resolution and control in erecting a tilted image. Prior art devices which tilted the lenses had to achieve full correction with lenses that tilted only approximately ± 18°. With the revolutionary technique taught herein, a full 360° revolution is available in which image tilt correction may be achieved. To use an analogy, prior art devices may be said to be "coarse tuned" while the present invention offers "fine tuning" capability.

Taken in total, the invention herein disclosed eliminates the need for total field correction, permits separation of pupils and of principal planes, and requires no translational variations of optical path length, all as required with prior art devices, and permits more precise resolution of the erected image.

These advantages allow utilization of optimum designs of unity or near-unity magnification Scheimpflug relay lenses. This means that the number of elements comprising these lenses can be reduced and the degree of image quality significantly improved. Use of fewer lens elements will result in a sizable increase in light transmission through the device as well.

Although the invention has been discussed in the context of its use with simulator visual systems, it is important to note that any other system requiring Scheimpflug correction may effectively utilize the revolving lens apparatus and method described. An example of such other use would be in the rectification of aerial photographs.

Adherence to the practices taught in this invention reduces the design of Scheimpflug correction devices from its previous status as an "art" to that of a "science". Complex mechanical linkages and optical designs are eliminated and an optimized, relatively simple device of reasonable cost results.

A preferred embodiment of the invention has been described. It should be obvious to those skilled in the art that various changes and modifications may be made therein without departing from the invention. It is therefore intended to cover herein all such changes and modifications as fall within the true spirit and scope of the invention. Such change or modification would include the selection of some axis other than the system axis about which the tilted relay lenses are to be rotated as may better accord with the internal configuration of a particular optical system.

Having thus described our invention, that which we claim as new and desire to secure by letters patent of the United States is:

1. In an optical system, a method of achieving Scheimpflug correction of a tilted image, comprising the steps of:

a. arranging Scheimpflug relay lenses at fixed tilt angles with respect to the system axis of said optical system;
b. revolving said Scheimpflug relay lenses about said system axis while maintaining said fixed tilt angle with respect to said system axis.

2. In an optical system, a method of achieving Scheimpflug correction of a tilted image, comprising the steps of:
a. arranging Scheimpflug relay lenses at fixed tilt angles with respect to the system axis of said optical system;
b. placing field lenses centered and maintained on the optical axis of the system such that the exit pupil of a preceding lens is imaged on the entrance pupil of a succeeding lens;
c. locating said image to be corrected at the entrance pupil of the first one of said Scheimpflug relay lenses; and
d. revolving said Scheimpflug relay lenses about system axes while maintaining said fixed tilt angle with respect to said system axes.

3. The method of claim 2 grouping said Scheimpflug relay lenses in pairs with an associated field lens and revolving each of said groups as a unit to achieve Scheimpflug correction.

4. In an optical system, apparatus for achieving Scheimpflug correction of a tilted image using Scheimpflug relay lenses comprising:
a. at least one Scheimpflug relay lens pair located at fixed tilt angles with respect to the system axis of said optical system, said tilt angles being a function of relay lens design and the number of said Scheimpflug relay lenses employed; and
b. means to revolve said Scheimpflug relay lenses about said system axis while maintaining said fixed tilt angle, whereby the tilt of said image may be corrected.

5. In an optical system, apparatus for achieving Scheimpflug correction of a tilted image using Scheimpflug relay lenses comprising:
a. at least one Scheimpflug relay lens pair located at fixed tilt angles with respect to the system axis of said optical system, said tilt angles being a function of relay lens design and the number of said Scheimpflug relay lenses employed;
b. field lenses centered and maintained on the optical axis to image the exit pupil of a preceding lens onto the entrance pupil of a succeeding lens, the number of said field lenses being a function of the number of said relay lenses employed; and
c. means to revolve said Scheimpflug relay lenses about said system axis while maintaining said fixed tilt angle, whereby the tilt of said image may be corrected.

6. The apparatus of claim 5 having several Scheimpflug relay lenses wherein said means for revolving said relay lenses provides for revolving pairs of said relay lenses and an associated field lens about said system axis to achieve said image tilt correction.

7. In an optical system, apparatus for achieving Scheimpflug correction of a tilted image using Scheimpflug relay lenses comprising:
a. a first and second Scheimpflug lens pair, each pair capable of independent revolution about the axis of the optical system, each Scheimpflug lens-pair comprising two fixed-tilt Scheimpflug relay lenses with a field lens centered and maintained on the optical axis to image the exit pupil of the preceding relay lens onto the entrance pupil of the succeeding relay lens;
b. a field lens on the optical axis of said system and between said first and second Scheimpflug lens-pairs to image the exit pupil of the first of said Scheimpflug lens-pairs onto the entrance pupil of the second of said Scheimpflug lens-pairs;
c. optical means to image the exit pupil of any preceding optics of said optical system onto the entrance pupil of the first of said Scheimpflug lens-pairs;
d. means to revolve the Scheimpflug lens-pairs about said system axis of said optical system to achieve Scheimpflug correction.

* * * * *